US012689981B2

(12) United States Patent
Lin

(10) Patent No.: US 12,689,981 B2
(45) Date of Patent: Jul. 21, 2026

(54) ACCESS POINT AND SCHEDULING METHOD THEREOF FOR ENHANCING THE POWER SAVING EFFICIENCY

(71) Applicant: Realtek Semiconductor Corp., HsinChu (TW)

(72) Inventor: Yu-Ling Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 191 days.

(21) Appl. No.: 18/195,370

(22) Filed: May 9, 2023

(65) Prior Publication Data

US 2024/0023016 A1      Jan. 18, 2024

(30) Foreign Application Priority Data

Jul. 18, 2022    (TW) ................................... 111126862

(51) Int. Cl.
*H04W 52/02*            (2009.01)
(52) U.S. Cl.
CPC ............................... *H04W 52/0216* (2013.01)
(58) Field of Classification Search
None
See application file for complete search history.

(56) References Cited

U.S. PATENT DOCUMENTS

| | | | |
|---|---|---|---|
| 10,433,252 B2 | 10/2019 | Asterjadhi | |
| 2016/0381704 A1 | 12/2016 | Chu | |
| 2017/0311258 A1* | 10/2017 | Asterjadhi | .......... H04W 28/022 |
| 2019/0253968 A1 | 8/2019 | Xiao | |
| 2020/0008095 A1 | 1/2020 | Patil | |
| 2020/0359265 A1* | 11/2020 | Azizi | .................. H04L 47/2416 |
| 2022/0217630 A1 | 7/2022 | Chen | |
| 2022/0303893 A1* | 9/2022 | Chu | ...................... H04W 76/40 |
| 2022/0353812 A1* | 11/2022 | Chen | ...................... H04W 16/22 |

FOREIGN PATENT DOCUMENTS

| | | |
|---|---|---|
| CN | 109891945 A | 6/2019 |
| CN | 110662278 A | 1/2020 |

* cited by examiner

*Primary Examiner* — Jae Y Lee
*Assistant Examiner* — Nam P. Cao
(74) *Attorney, Agent, or Firm* — Winston Hsu

(57) ABSTRACT

A scheduling method of scheduling a target wake time (TWT) communication between an access point and at least one station. The scheduling method includes the access point adjusting a broadcast TWT schedule according to a power saving setting, and the access point transmitting the broadcast TWT schedule. The broadcast TWT schedule includes a broadcast TWT SP start time, a broadcast TWT service period and a broadcast TWT interval.

20 Claims, 10 Drawing Sheets

ACCESS POINT AND SCHEDULING METHOD THEREOF FOR ENHANCING THE POWER SAVING EFFICIENCY

BACKGROUND OF THE INVENTION

1. Field of the Invention

The present invention relates to wireless communication, and more particularly, to an access point in wireless communication and a method for scheduling a target wake time for power saving.

2. Description of the Prior Art

Wi-Fi is a wireless local area network (WLAN) technology based on the IEEE 802.11 standard, and has been widely used in various electronic devices such as notebook computers, tablet computers, and smart phones. A wireless local area network (WLAN) usually includes one access point and many stations, with the access point being connected to each station. If all stations can transmit data to the access point at any time, the access point will consume significantly a lot more power. Wi-Fi 6 (also known as IEEE802.11ax) adopts a target wake time (TWT) technology to allow an access point to define a TWT service period (SP) for a station or a set of stations. In the TWT service period, the station or the set of stations can perform data transmissions with the access point; outside the TWT service period, the station or the set of stations enters a doze mode, thereby reducing power consumption.

However, in the related art, the access point enters the doze mode only when all the stations enter the doze mode, degrading the power saving efficiency of the access point.

SUMMARY OF THE INVENTION

According to an embodiment of the invention, a scheduling method for scheduling a target wake time (TWT) communication between an access point and at least one station includes the access point adjusting a broadcast TWT schedule according to a power saving setting, the broadcast TWT schedule comprising a broadcast TWT service period (SP) start time, a broadcast TWT SP and a broadcast TWT interval, and the access point transmitting the broadcast TWT schedule.

According to another embodiment of the invention, an access point of scheduling a target wake time (TWT) communication from the access point to at least one station includes a processor and a transceiver. The processor is used to adjust a broadcast TWT schedule according to a power saving setting, the broadcast TWT schedule including a broadcast TWT SP start time, a broadcast TWT SP and a broadcast TWT interval. The transceiver is coupled to the processor and is used to transmit the broadcast TWT schedule.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
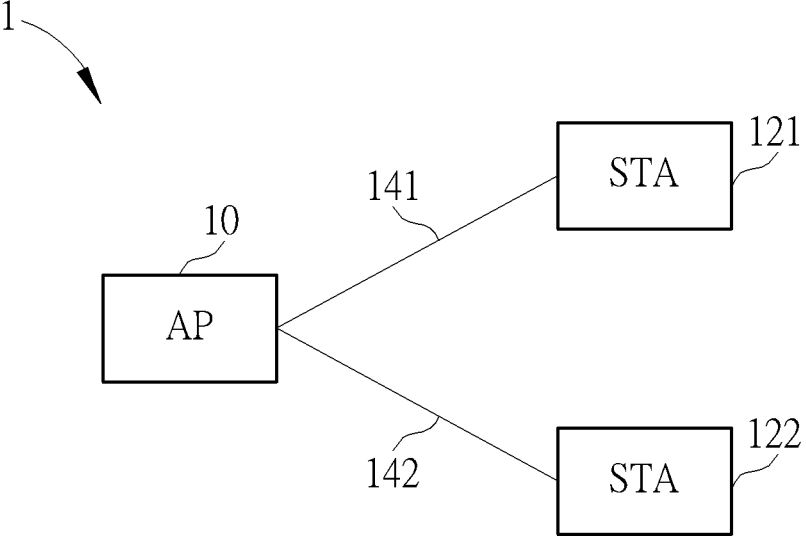
FIG. 1 is a schematic diagram of a wireless communication system according to an embodiment of the invention.

FIG. 1 is a schematic diagram of a wireless communication system 1 according to an embodiment of the invention. The wireless communication system 1 is compatible with IEEE 802.11 standards, for example, the IEEE 802.11n standard and the IEEE 802.11ac standard. The wireless communication system 1 may support target wake time (TWT) scheduling for the communication devices (e.g., access points or stations) in the wireless communication system 1 to enter a doze mode and wake up during a service period to perform data transmission, thereby reducing the power consumption of the communication devices. In an embodiment, an access point may perform TWT scheduling according to a power saving setting of the access point, so as to increase the power saving efficiency while satisfying the power saving requirement of the access point. Further, the wireless communication system 1 may support the orthogonal frequency-division multiple access (OFDMA).

Figure 2:
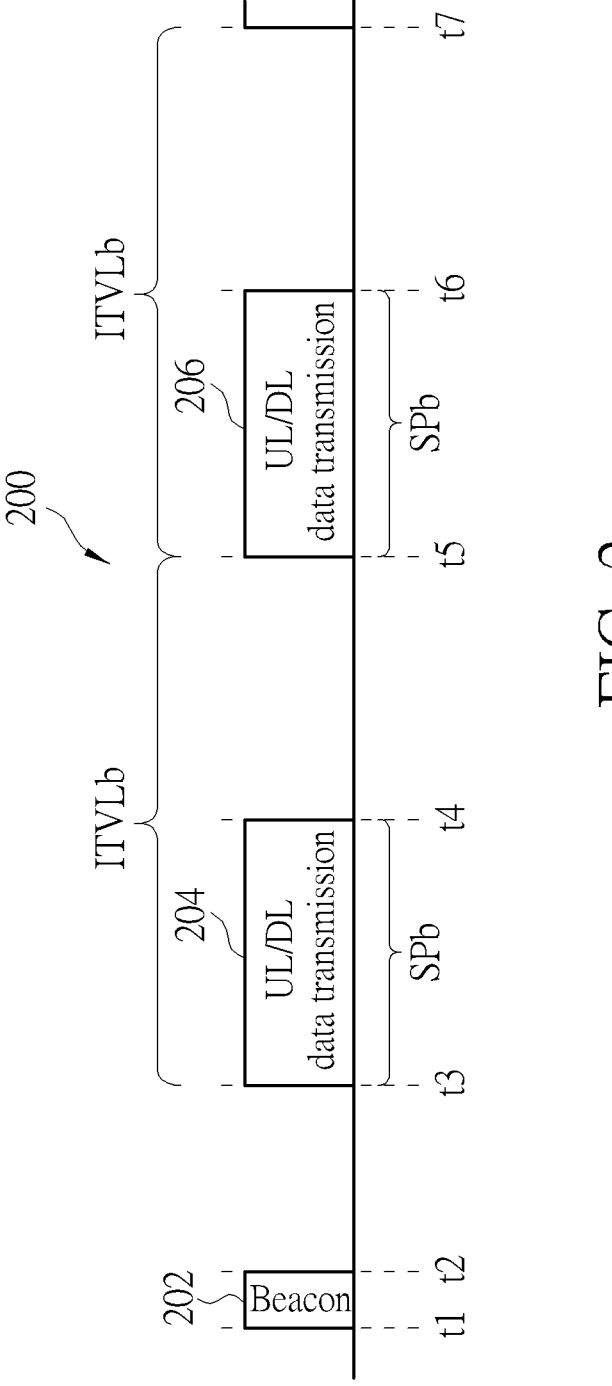
FIG. 2 shows a timing diagram of a broadcast TWT flow.
Figure 3:
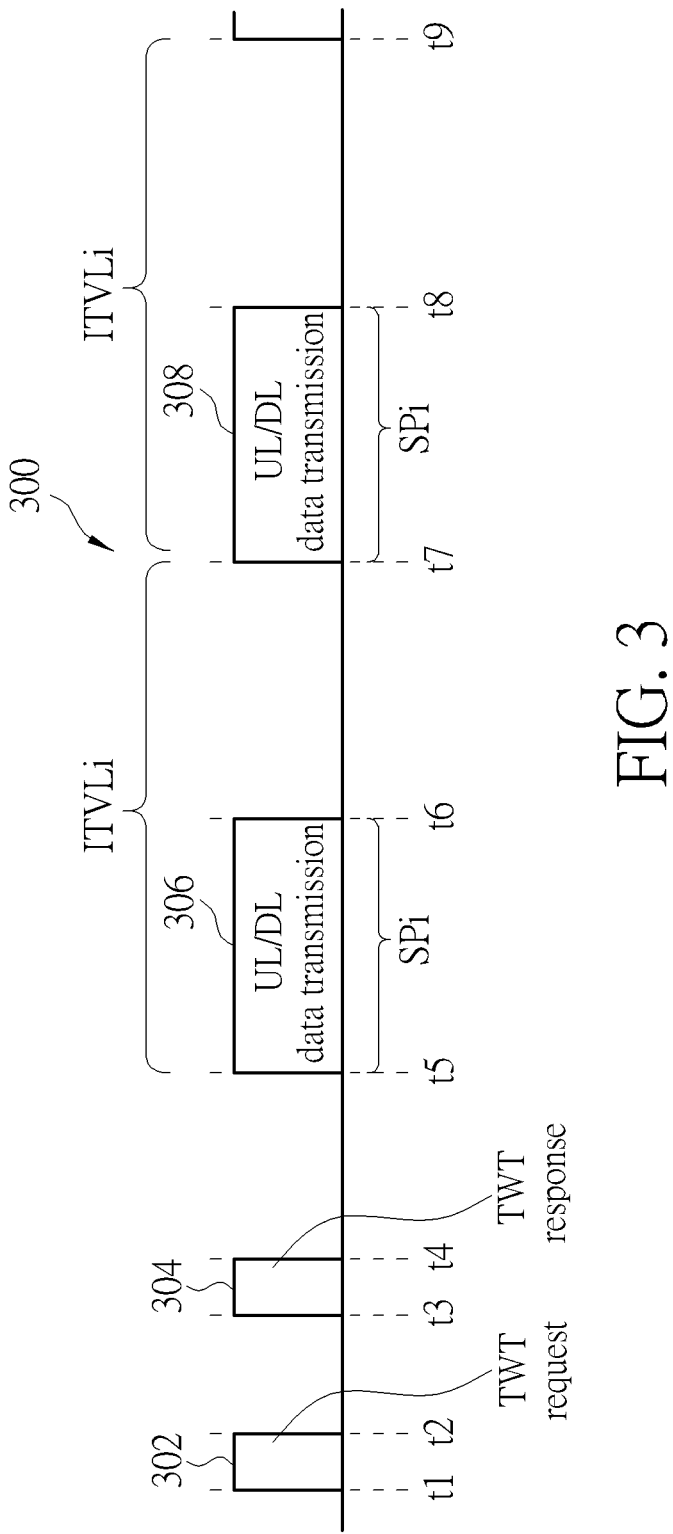
FIG. 3 shows a timing diagram of an individual TWT flow.

The wireless communication system 1 includes an access point (AP) 10 and stations (STA) 121 and 122. The STA 121 and the STA 122 may be associated with the AP 10. A wireless link 141 may be established between the AP 10 and the STA 121, and a wireless link 142 may be established between the AP 10 and the STA 122. The AP 10 may be further coupled to the Internet or other networks. The AP 10 may be a mobile phone, a wireless router, or other network devices. The STA 121 and the STA 122 may be mobile phones, laptops, cameras, Internet of things (IoT) devices, gaming devices, medical devices, wearable devices, or other electronic devices. The AP 10 may employ a broadcast TWT and/or an individual TWT for TWT scheduling. FIGS. 2 and 3 show timing diagrams of a broadcast TWT flow 200 and an individual TWT flow 300, respectively.

In the broadcast TWT flow 200, the AP 10 may set and advertise a broadcast TWT schedule without negotiating with the STA 121 and the STA 122, and the STA 121 and the STA 122 may join the broadcast TWT group. Referring to FIG. 2, between Time t1 and Time t2, the AP 10 transmits a beacon 202 having the broadcast TWT schedule and other information. The broadcast TWT schedule may include a broadcast TWT SP start time, a broadcast TWT service period (SP), and a broadcast TWT interval. The broadcast TWT service period indicates the duration for a data transmission, and may be e.g., 60 milliseconds (ms), the broadcast TWT interval indicates the interval between the start times of two consecutive broadcast TWT service periods, and may be e.g., 200 ms, and the broadcast TWT SP start time indicates the start time of the next broadcast TWT service period, e.g., the transmission time of the next beacon 202. The STA 121 and the STA 122 may receive the broadcast TWT schedule via a broadcast beacon 202, enter the doze mode, and wake up at the broadcast TWT SP start time for uplink (UL) or downlink (DL) data transmissions. The AP 10 may simultaneously transmit downlink data to the STA 121 and the STA 122 using the OFDMA techniques. Between Time t2 and Time t3, the AP 10, the STA 121 and the STA 122 enter the doze mode. Between Time t3 and Time t4, the AP 10, the STA 121 and the STA 122 wake up for the UL/DL data transmission period 204. Time t3 may be the broadcast TWT SP start time, and the absolute difference between the Time t3 and Time t4 may be the broadcast TWT service period SPb. Between Time t4 and Time t5, the AP 10, the STA 121, and the STA 122 enter the doze mode, and between Time t5 and Time t6, the AP 10, the STA 121, and the STA 122 wake up for the UL/DL data transmission period 206. Between Time t6 and Time t7, the AP 10, the STA 121, and the STA 122 enter the doze mode again. The absolute difference between Time t3 and Time t5 and the absolute difference between Time t5 and Time t7 may be the broadcast TWT intervals ITVLb, and the absolute difference between Time t5 and Time t6 may be the broadcast TWT service period SPb.

In the individual TWT flow 300, the AP 10 may negotiate with STA 121 or STA 122 to set up an individual TWT schedule. The individual TWT flow 300 in FIG. 3 is explained with reference to the individual TWT schedule of the STA 121. Between Time t1 and Time t2, the STA 121 transmits a TWT request 302 to the AP 10, then between Time t3 and Time t4, the AP 10 transmits a TWT response 304 to the STA 121. The TWT request 302 may include a requested individual TWT schedule including a requested individual TWT SP start time, a requested individual TWT service period, and a requested individual TWT interval. The TWT response 304 may include a recommended individual TWT schedule including a recommended individual TWT SP start time, a recommended individual TWT service period, and a recommended individual TWT interval. The recommended individual TWT SP start time, the recommended individual TWT service period, and the recommended individual TWT interval may be equal to or different from the requested individual TWT SP start time, the requested individual TWT service period, and the requested individual TWT interval, respectively. While FIG. 3 shows that the AP 10 and the STA 121 only exchange a TWT request 302 and a TWT response 304 to complete the negotiation of the individual TWT schedule, in some embodiments, the AP 10 and the STA 121 may exchange multiple TWT requests 302 and the TWT responses 304 to complete the negotiation. After the negotiation is completed, between Time t4 and Time t5, the AP 10 and the STA 121 enter the doze mode. Between Time t5 and Time t6, the AP 10 and the STA 121 wake up for the UL/DL data transmission period 306. Time t5 may be the individual TWT SP start time, and the absolute difference between Time t5 and Time t6 may be the individual TWT service period SPi. Between Time t6 and Time t7, the AP 10 and the STA 121 enter the doze mode again, and between Time t7 and Time t8, the AP 10 and the STA 121 wake up for the UL/DL data transmission period 308. Between Time t8 and Time t9, the AP 10 and the STA 121 enter the doze mode again. The absolute differences between Time t5 and Time t7 and between Time t7 and Time t9 may be the individual TWT intervals ITVLi, and the absolute difference between Time t7 and Time t8 may be the individual TWT service period SPi.

Figure 4:
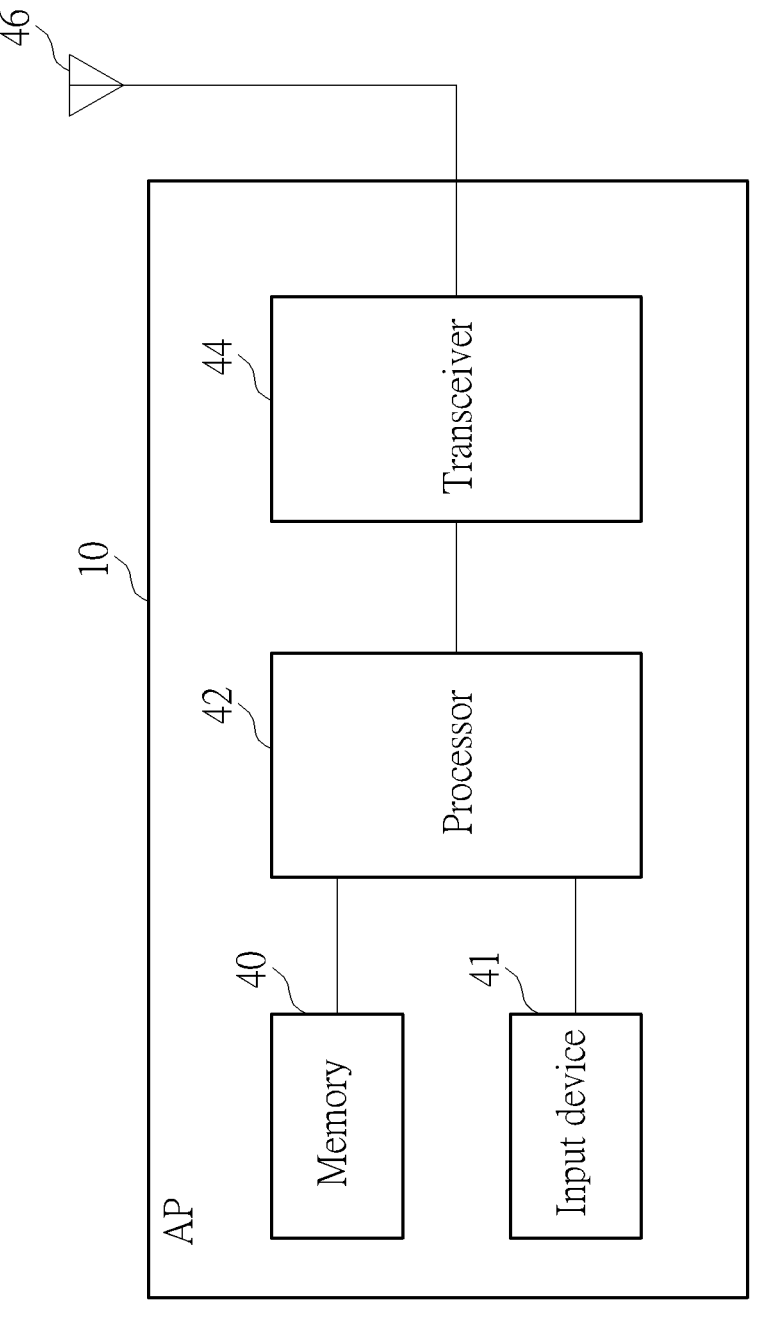
FIG. 4 is a block diagram of the access point in FIG. 1.

FIG. 4 is a block diagram of the AP 10. The AP 10 includes a memory 40, an input device 41, a processor 42, a transceiver 44 and an antenna 46. The memory 40 and the input device 41 may be coupled to the processor 42, and the processor 42, the transceiver 44 and the antenna 46 may be coupled in sequence. The memory 40 may store data and/or codes, and the codes may be used to implement the scheduling method of the AP 10. The input device 41 may be a keyboard, a mouse, a touch screen or other input devices for receiving the power saving setting of the AP 10 from a user. The power saving setting of the AP 10 may include a combination of an ideal power saving ratio, a predetermined TWT interval, a predetermined TWT service period, and a minimum power saving ratio. The processor 42 may execute the code in the memory 40 to perform TWT scheduling according to the power saving setting of the AP 10. The antenna 46 may include one or more antennas for supporting a single user (SU) or multi-user (MU) transmission. The transceiver 44 may transmit the TWT schedule via the antenna 46, and perform data transmissions according to the TWT schedule.

The processor 42 may create a broadcast TWT schedule according to the power saving setting of the AP 10 in a predetermined power saving mode, and add all associated stations to the broadcast TWT group, and the transceiver 44 may transmit the broadcast TWT schedule, so that all the associated stations may perform data transmissions according to the broadcast TWT schedule, so as to satisfy the power saving requirement of the AP 10. For example, the AP 10 may add STA 121 and the STA 122 to the broadcast TWT group to enable STA 121 and the STA 122 to transmit data according to the broadcast TWT schedule. The broadcast TWT group may be stored in the memory 40. Since the STA 121 and the STA 122 may perform the data transmissions according to the broadcast TWT schedule, the power saving efficiency of the AP 10 will be enhanced significantly. The predetermined power saving mode may be a beacon mode, a delivery traffic indication message (DTIM) mode, a predetermined TWT interval mode or a predetermined TWT service period mode.

In some embodiments, the predetermined power saving mode may be the beacon mode, and the power saving setting of the AP 10 may include an ideal power saving ratio, for example, the ideal power saving ratio may be 90%. The processor 42 may adjust the broadcast TWT service period SPb according to the ideal power saving ratio and the beacon interval, and set the broadcast TWT interval ITVLb according to the beacon interval. The beacon interval may also be referred to as target beacon transmit time (TBTT). The AP 10 may periodically broadcast the beacon 202 according to the TBTT. For example, the TBTT may be 100 ms, and the AP 10 may transmit a beacon every 100 ms. The processor 42 may adjust the broadcast TWT service period SPb to $10(=100*(1-0.9))$ ms, and set the broadcast TWT interval ITVLb to 100 ms.

In other embodiments, the predetermined power saving mode may be the DTIM mode, and the power saving setting of the AP 10 may include an ideal power saving ratio. The processor 42 may adjust the broadcast TWT service period SPb according to the ideal power saving ratio and a DTIM interval, and set the broadcast TWT interval IVTLb according to the DTIM interval. The DTIM beacon is used to notify the station whether the data is ready in the AP 10. The DTIM interval is the interval between two consecutive DTIM beacons, and may be a multiple of TBTT. For example, the DTIM may be 2TBTT, and the AP 10 may transmit 1 DTIM beacon every 200 ms. If the ideal power saving ratio is 90%, the processor 42 may adjust the broadcast TWT service period SPb to 20(=200*(1−0.9)) ms, and set the broadcast TWT interval ITVLb to 200 ms.

In other embodiments, the predetermined power saving mode may be the predetermined TWT interval mode, and the power saving setting of the AP 10 may include an ideal power saving ratio and a predetermined TWT interval. The processor 42 may adjust the broadcast TWT service period SPb according to the ideal power saving ratio and the predetermined TWT interval, and set the broadcast TWT interval IVTLb according to the predetermined TWT interval. If the ideal power saving ratio is 90% and the predetermined TWT interval is 200 ms, the processor 42 may adjust the broadcast TWT service period SPb to 20(=200* (1−0.9)) ms, and set the broadcast TWT interval ITVLb to 200 ms.

In other embodiments, the predetermined power saving mode may be the predetermined TWT service period mode, and the power saving setting of the AP 10 may include an ideal power saving ratio and a predetermined TWT service period. The processor 42 may adjust the broadcast TWT interval IVTLb according to the ideal power saving ratio and the predetermined TWT service period, and set the broadcast TWT service period SPb according to the predetermined TWT service period. If the ideal power saving ratio is 90% and the predetermined TWT service period is 10 ms, the processor 42 may set the broadcast TWT service period SPb to 10 ms, and adjust the broadcast TWT interval ITVLb to 100(=10/(1−0.9)) ms.

If the associated station refuses to join the broadcast TWT group and would like to create an individual TWT schedule, the AP 10 may align the individual TWT SP start time of the individual TWT schedule and the broadcast TWT SP start time of the broadcast TWT schedule to determine whether the power saving requirement of the AP 10 can be satisfied. If the power saving requirement of the AP 10 can be satisfied, the AP 10 may transmit the aligned individual TWT schedule to the associated stations. If the associated stations accept the aligned individual TWT schedule, since the individual TWT SP start time and the broadcast TWT SP start time are already aligned, the AP 10 may reduce the time for data transmission, thereby enhancing the power saving efficiency. In some embodiments, the transceiver 44 may receive a first individual TWT request from the first associated station, the first individual TWT request including the first requested individual TWT SP start time, the first requested individual TWT service period, and the first requested individual TWT interval. The processor 42 may set the first individual TWT SP start time to the broadcast TWT SP start time, set the first individual TWT service period according to the first requested individual TWT service period, and set the first individual TWT interval according to the first requested individual TWT interval, so as to obtain the first individual TWT schedule, the first individual TWT schedule including the broadcast TWT SP start time, the first individual TWT service period and the first individual TWT interval. If applying the first individual TWT schedule and the broadcast TWT schedule can satisfy the power saving requirement of the AP 10, the transceiver 44 may transmit the first individual TWT schedule to the first associated station. A scheduling method 500 in FIG. 5 is now explained in detail with reference to an example of the AP 10 and the STA 121 serving as the first associated station.

Figure 5:
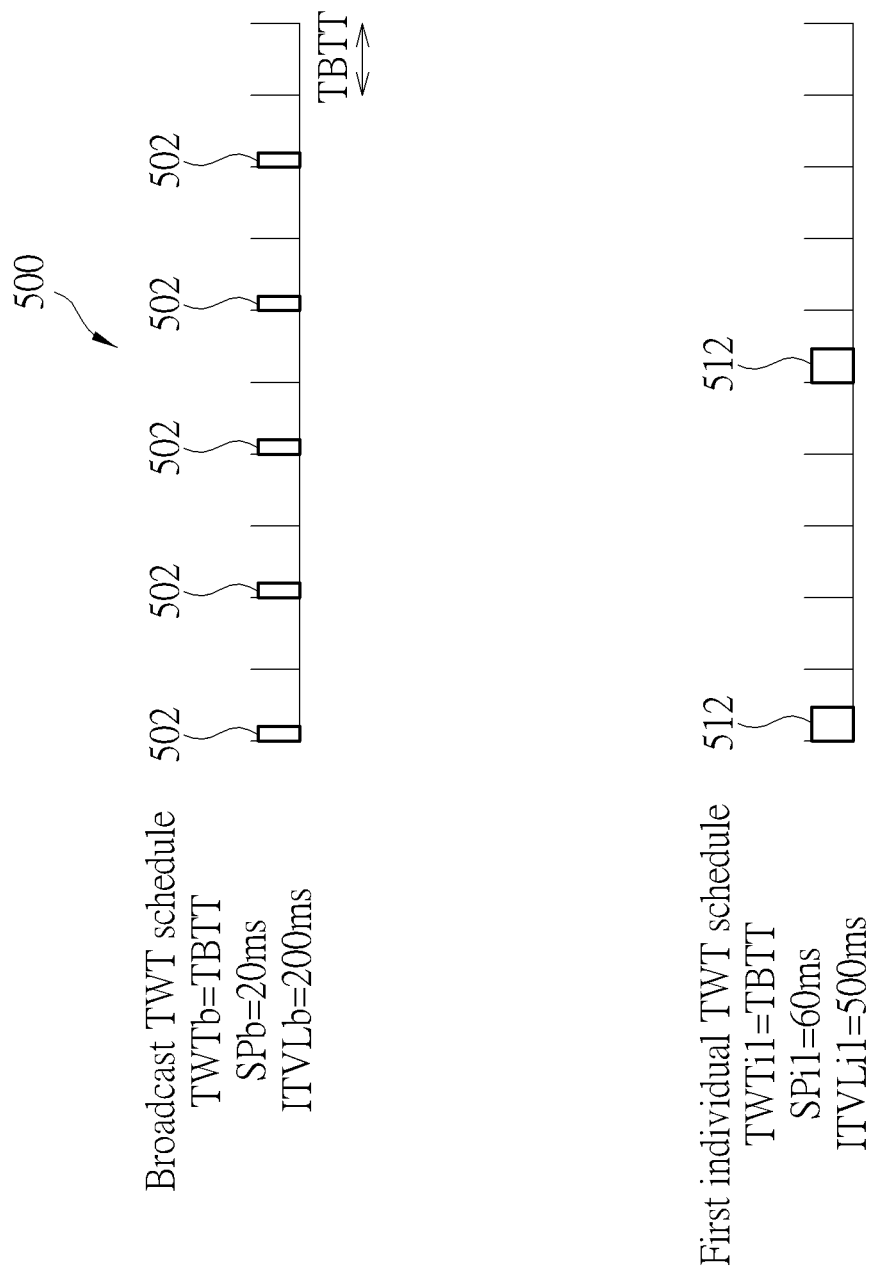
FIG. 5 shows a schematic diagram of a method of scheduling the access point in FIG. 1 according to an embodiment of the invention.

FIG. 5 is a schematic diagram of the scheduling method 500 of the AP 10, showing the broadcast TWT schedule and the first individual TWT schedule. FIG. 5 shows an example of aligning the first individual TWT SP start time with the broadcast TWT SP start time to meet the power saving requirement of the AP 10. The broadcast TWT schedule includes a broadcast TWT SP start time TWTb, a broadcast TWT service period SPb, and a broadcast TWT interval IVTLb, where the broadcast TWT SP start time TWTb is equal to TBTT, the broadcast TWT service period SPb is equal to 20 ms, and the broadcast TWT interval IVTLb is equal to 200 ms. The first individual TWT request includes a requested individual TWT SP start time TWTrq1, a requested individual TWT service period SPrq1, and a requested individual TWT interval IVTLrq1, where the requested individual TWT SP start time TWTrq1 is equal to TBTT+10 ms, the requested individual TWT service period SPrq1 is equal to 64 ms, and the requested individual TWT interval IVTLrq1 is equal to 512 ms.

The processor 42 sets the individual TWT SP start time TWTi1 to the broadcast TWT SP start time TWTb (TWTi1=TWTb=TBTT), thereby aligning the individual TWT SP start time TWTi1 and the broadcast TWT SP start time TWTb. Next, the processor 42 rounds the requested individual TWT service period SPrq1 to the nearest 10 ms to generate the individual TWT service period SPi1 (SPi1=60 ms), and rounds the requested individual TWT interval ITVLrq1 to the nearest 100 ms to generate the individual TWT interval ITVLi1 (ITVLi1=500 ms), thereby generating the first individual TWT schedule.

In some embodiments, the power saving setting of the AP 10 may include a minimum power saving ratio, for example, the minimum power saving ratio may be 70%. In some embodiments, the processor 42 may generate a set of broadcast TWT service periods 502 according to the broadcast TWT SP start time TWTb, the broadcast TWT service period SPb, and the broadcast TWT interval INTLb, and generate a set of individual TWT service periods 512 according to the individual TWT start times TWTi1, the individual TWT service period SPi1 and the individual TWT interval IVTLi. The processor 42 may compute the doze ratio of the AP 10 according to the set of broadcast TWT service periods 502 and the set of individual TWT service periods 512. In some embodiments, processor 42 may sum the non-overlapping periods of the set of broadcast TWT service periods 502 and the set of individual TWT service periods 512 in a predetermined period to compute the doze ratio of the AP 10. For example, in FIG. 5, the predetermined period is 1 second (s) and the set of individual TWT service periods 512 are partially overlapping with the set of broadcast TWT service periods 502, and as a result, the doze ratio of the AP 10 is 80% (=1−((60+20+20+60+20+20)/1000)), exceeding the minimum power saving ratio (70%) and satisfying the power saving requirement of the AP 10, and therefore, the transceiver 44 will transmit the first individual TWT schedule to the STA 121. The first individual TWT schedule may be a recommended individual TWT schedule that may be accepted or rejected by the STA 121.

If a plurality of associated stations refuse to join the broadcast TWT group and would like to create individual TWT schedules, the AP 10 may align the plurality of individual TWT SP start times of the plurality of individual TWT schedules and the broadcast TWT SP start times of the broadcast TWT schedules start time, so as to determine whether the power saving requirement of the AP 10 can be satisfied. If the power saving requirement of the AP 10 is satisfied, the AP 10 may transmit the aligned individual TWT schedules to the associated stations, respectively. If the power saving requirement of the AP 10 cannot be satisfied, the AP 10 may adjust the individual TWT service period and/or the individual TWT interval of one of the plurality of individual TWT schedules to satisfy the power saving requirement of the AP 10. In some embodiments, if the power saving requirement of the AP 10 cannot be satisfied, the AP 10 may adjust the individual TWT service period and/or the individual TWT interval of the last added individual TWT schedule to satisfy the power saving requirement of the AP 10.

In some embodiments, after scheduling the first individual TWT, the transceiver 44 may receive a second individual TWT request from the second associated station, the second individual TWT request including a second requested individual TWT SP start time, a second requested individual TWT service period, and a second requested individual TWT interval. The processor 42 may set the second individual TWT SP start time to the broadcast TWT SP start time, set the second individual TWT service period according to the second requested individual TWT service period, and set the second individual TWT interval according to the second requested individual TWT interval, so as to obtain the second individual TWT schedule, the second individual TWT schedule including the broadcast TWT SP start time, the second individual TWT service period and the second individual TWT interval. If the first individual TWT schedule, the second individual TWT schedule and the broadcast TWT schedule may satisfy the power saving requirement of the AP 10, the transceiver 44 may transmit the second individual TWT schedule to the second associated station. If the second associated station accepts the second individual TWT schedule, since the first individual TWT schedule, the second individual TWT schedule and the broadcast TWT schedule are aligned and the power saving requirement is satisfied, the power savings efficiency of the AP 10 will be enhanced.

Figure 7:
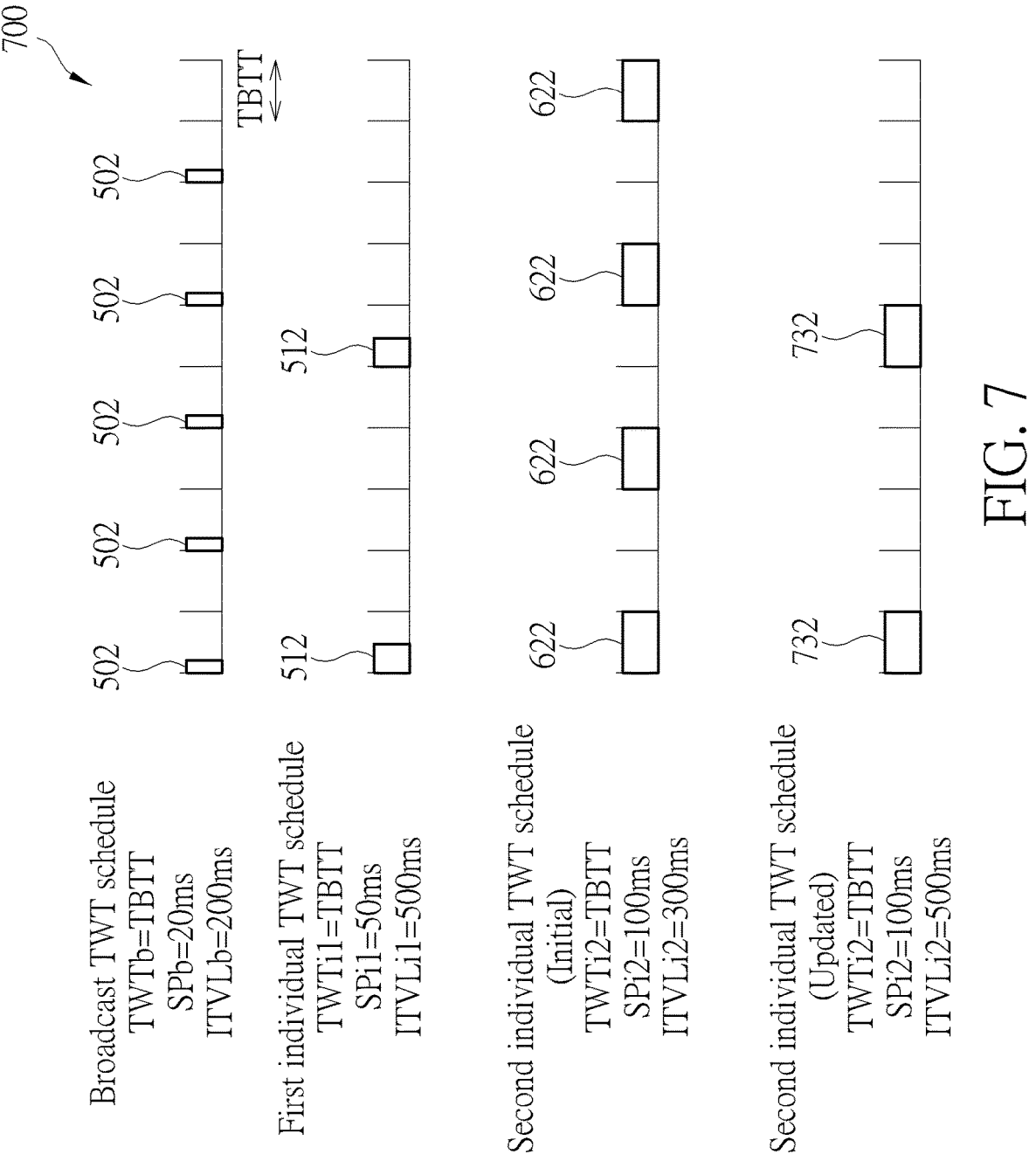
FIG. 7 shows a schematic diagram of a method of scheduling the access point in FIG. 1 according to another embodiment of the invention.
Figure 8:
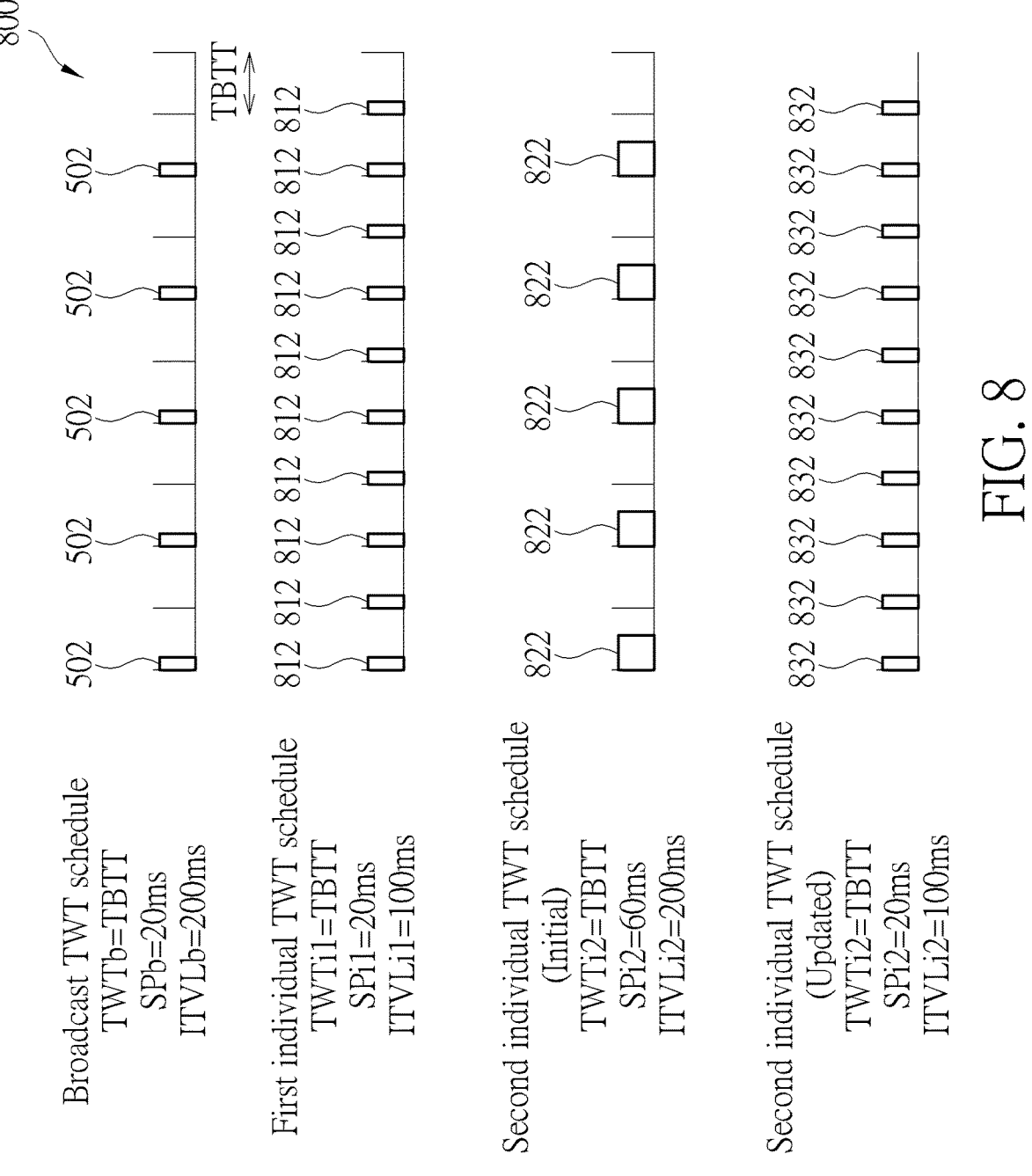
FIG. 8 shows a schematic diagram of a method of scheduling the access point in FIG. 1 according to another embodiment of the invention.

If the first individual TWT schedule, the second individual TWT schedule and the broadcast TWT schedule cannot satisfy the power saving requirement of the AP 10, the processor 42 may adjust the second individual TWT service period and/or the second individual TWT interval to satisfy the power saving requirement of the AP 10. In the following paragraphs, the scheduling methods 600 to 800 in FIGS. 6 to 8 are explained in detail with reference to the AP 10, the STA 121 being the first associated station and the STA 122 being the second associated station.

Figure 6:
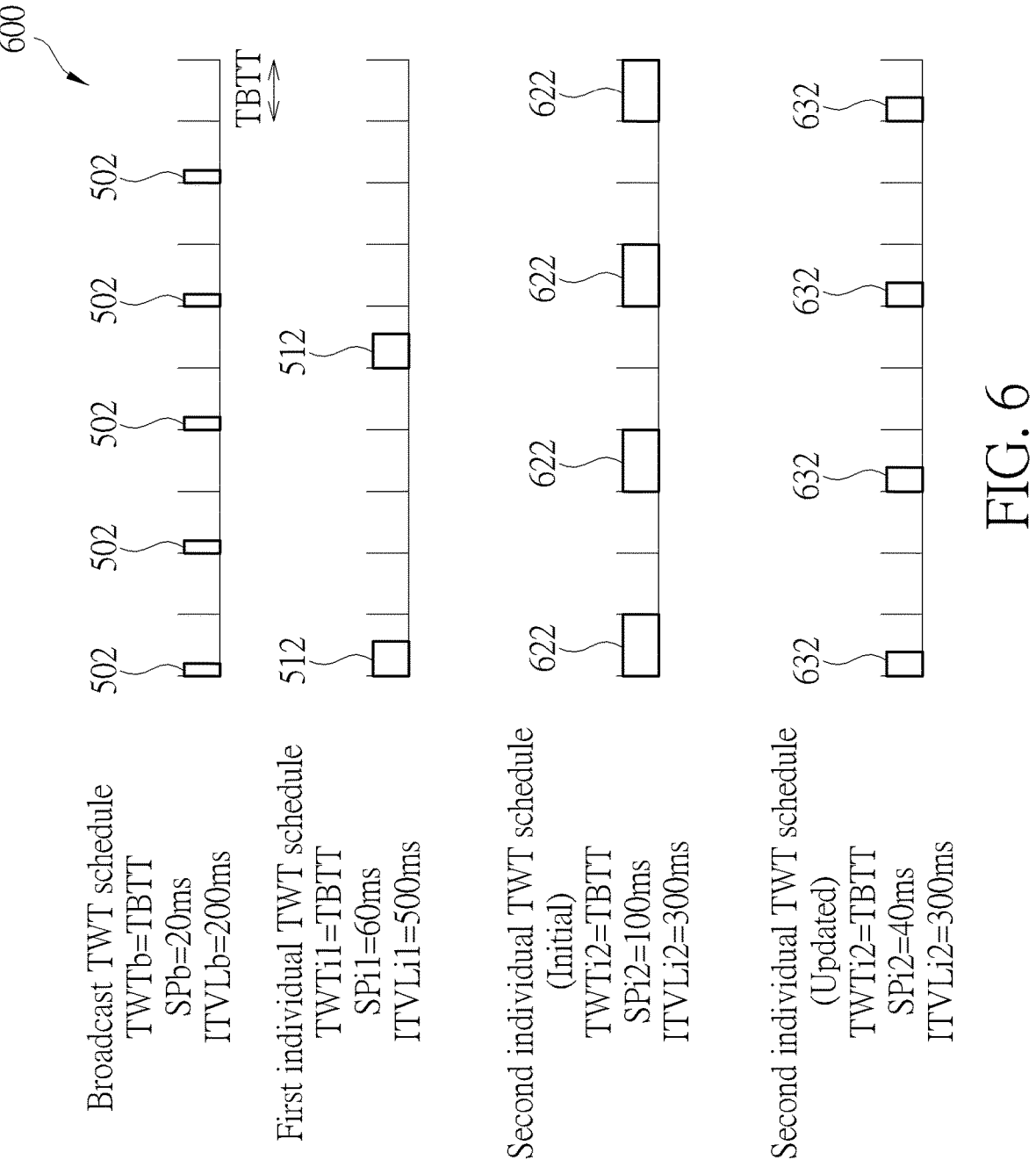
FIG. 6 shows a schematic diagram of a method of scheduling the access point in FIG. 1 according to another embodiment of the invention.

FIG. 6 shows a schematic diagram of the scheduling method 600 of the AP 10, showing a broadcast TWT schedule, a first individual TWT schedule, and a second individual TWT schedule. FIG. 6 shows an embodiment of shortening the second individual TWT service period in the second individual TWT schedule while maintaining the second individual TWT interval to meet the power saving requirement of the AP 10. The broadcast TWT schedule and the first individual TWT schedule in FIG. 6 and FIG. 5 are similar, and the explanations thereof are omitted here for brevity. The AP 10 may further receive a second individual TWT request includes a requested individual TWT SP start time TWTrq2, a requested individual TWT service period SPrq2, and a requested individual TWT interval IVTLrq2, where the requested individual TWT SP start time TWTrq2 is equal to TBTT+10 ms, the requested individual TWT service period SPrq2 is equal to 100 ms, and the requested individual TWT interval IVTLrq2 is equal to 300 ms.

The processor 42 sets the individual TWT SP start time TWTi2 to the broadcast TWT SP start time TWTb (TWTi2=TWTb=TBTT), thereby aligning the individual TWT SP start time TWTi2 and the broadcast TWT SP start time TWTb. Next, the processor 42 sets the individual TWT service period SPi2 to the requested individual TWT service period SPrq2 (SPi2=SPrq2=100 ms), and sets the individual TWT interval ITVLi2 to the requested individual TWT interval ITVLrq2 (ITVLi2=ITVLrq2=300 ms), thereby generating the second individual TWT schedule.

In some embodiments, the processor 42 may generate the set of broadcast TWT service periods 502 and the set of first individual TWT service periods 512 according to the method in FIG. 5, and generate a set of individual TWT service periods 622 according to the individual TWT SP start time TWTi2, the individual TWT service period SPi2 and the individual TWT interval IVTLi2. The processor 42 computes the doze ratio of the AP 10 according to the set of broadcast TWT service periods 502, the set of individual TWT service periods 512, and the set of individual TWT service periods 622. In some embodiments, processor 42 may sum the non-overlapping periods of the set of broadcast TWT service periods 502, the set of individual TWT service periods 512, and the set of individual TWT service periods 622 in a predetermined period to compute the doze ratio of the AP 10. For example, in FIG. 6, the predetermined period is 1 s and the set of broadcast TWT service periods 502, the set of individual TWT service periods 512 and the set of individual TWT service periods 622 are partially overlapping, resulting in the doze ratio of the AP being 48% (=1−((100+20+100+20+60+100+20+100)/1000)), less than the minimum power saving ratio (=70%), and therefore, the power saving requirement of the AP 10 cannot be satisfied. In order to satisfy the power saving requirement of the AP 10, the processor 42 maintains the individual TWT interval ITVLi2 unchanged (ITVLi2=300 ms), and reduces the individual TWT service period SPi2 (SPi2=40 ms), thereby updating the second individual TWT schedule. The processor 42 generates a set of individual TWT service periods 632 according to the individual TWT SP start time TWTi2, the individual TWT service period SPi2 and the individual TWT interval IVTLi2, and computes the doze ratio of the AP 10 according to the set of broadcast TWT service periods 502, the set of individual TWT service periods 512 and the set of individual TWT service periods 632. In some embodiments, processor 42 may sum the non-overlapping periods of the set of broadcast TWT service periods 502, the set of individual TWT service periods 512, and the set of individual TWT service periods 632 in a predetermined period to compute the doze ratio of the AP 10. For example, the set of broadcast TWT service periods 502, the set of individual TWT service periods 512, and the set of individual TWT service periods 632 are partially overlapping, resulting in the doze ratio of the AP 10 being 70% (=1460+20+40+20+60+40+20+40)/1000)), equal to the minimum power saving ratio (70%), and therefore, the power saving requirement of the AP 10 may be satisfied, and the transceiver 44 may transmit the updated second individual TWT schedule to the STA 122. The second individual TWT schedule may be a recommended individual TWT schedule, and the STA 122 may accept or reject the second individual TWT schedule.

FIG. 7 is a schematic diagram of the scheduling method 700 of the AP 10, showing a broadcast TWT schedule, a first individual TWT schedule, and a second individual TWT schedule. FIG. 7 shows an embodiment of increasing the second individual TWT interval in the second individual TWT schedule while maintaining the second individual TWT service period to meet the power saving requirement of the AP 10. The broadcast TWT schedule, the first individual TWT schedule, and the second individual TWT schedule (the first iteration) in FIG. 7 and FIG. 6 are similar, and the explanations thereof will be omitted here for brevity.

According to the preceding paragraphs, since the doze ratio (48%) of the AP 10 generated by the second individual TWT schedule (the first iteration) is less than the minimum power saving ratio (70%), the power saving requirement of the AP 10 cannot be satisfied. In order to satisfy the power saving requirement of the AP 10, the processor 42 maintains the individual TWT service period SPi2 unchanged (SPrq2=100 ms), and increases the individual TWT interval ITVLi2 (ITVLi2=500 ms), thereby updating the second individual TWT schedule. In some embodiments, the processor 42 may select the individual TWT interval ITVLi2 (=500 ms) from the existing broadcast TWT interval ITVLb (100 ms) and the individual TWT interval ITVLi1 (500 ms). The processor 42 generates a set of individual TWT service periods 732 according to the individual TWT SP start time TWTi2, the individual TWT service period SPi2 and the individual TWT interval IVTLi2, and computes the doze ratio of the AP 10 according to the set of broadcast TWT service periods 502, the set of individual TWT service periods 512 and the set of individual TWT service periods 732. In some embodiments, processor 42 may sum the non-overlapping periods of the set of broadcast TWT service periods 502, the set of individual TWT service periods 512, and the set of individual TWT service periods 732 in a predetermined period to compute the doze ratio of the AP 10. For example, the set of broadcast TWT service periods 502, the set of individual TWT service periods 512, and the set of individual TWT service periods 732 are partially overlapping, resulting in the doze ratio of the AP 10 being 72% (=1−((100+20+20+100+20+20)/1000)), exceeding the minimum power saving ratio (70%), and therefore, the power saving requirement of the AP 10 may be satisfied, and the transceiver 44 may transmit the updated second individual TWT schedule to the STA 122. The second individual TWT schedule may be a recommended individual TWT schedule, and the STA 122 may accept or reject the second individual TWT schedule.

FIG. 8 is a schematic diagram of the scheduling method 800 of the AP 10, showing a broadcast TWT schedule, a first individual TWT schedule, and a second individual TWT schedule. FIG. 8 shows an embodiment of adjusting the second individual TWT service period and the second individual TWT interval in the second individual TWT schedule to meet the power saving requirement of the AP 10. The broadcast TWT schedules in FIG. 8 and FIG. 5 are similar, and the explanation thereof will be omitted here for brevity. The first individual TWT schedule of the first associated station has been created and includes individual TWT SP start time TWTi1, individual TWT service period SPi1, and individual TWT interval IVTLi, where individual TWT SP start time TWTi1 is equal to TBTT, individual TWT service period SPi1 is equal to 20 ms, and the individual TWT interval IVTLi1 is equal to 100 ms. The AP 10 may further receive a second individual TWT request from the second associated station, the second individual TWT request including a requested individual TWT SP start time TWTrq2, a requested individual TWT service period SPrq2, and a requested individual TWT interval IVTLrq2, where the requested individual TWT SP start time TWTrq2 is equal to TBTT+10 ms, the requested individual TWT service period SPrq2 is equal to 60 ms, and the requested individual TWT interval IVTLrq2 is equal to 160 ms.

The processor 42 sets the individual TWT SP start time TWTi2 to the broadcast TWT SP start time TWTb (TWTi2=TWTb=TBTT), thereby aligning the individual TWT SP start time TWTi2 and the broadcast TWT SP start time TWTb. Next, the processor 42 sets the individual TWT service period SPi2 to the requested individual TWT service period SPrq2 (SPi2=SPrq2=60 ms), and selects the larger TWT interval between the broadcast TWT interval ITVLb (200 ms) and individual TWT interval ITVLi1 (100 ms) which is closer to the requested individual TWT service period IVTLrq2(160 ms) as the individual TWT interval ITVLi2 (ITVLi2=200 ms), thereby generating the second individual TWT schedule. The larger TWT interval is selected as the individual TWT interval ITVLi2 to increase the intervals between data transmissions, reducing the power consumption for the second associated station.

In some embodiments, the processor 42 may generate the set of broadcast TWT service periods 502 according to the method outlined in FIG. 5, generate a set of individual TWT service periods according to the individual TWT SP start time TWTi1, the individual TWT service period SPi1, and the individual TWT interval IVTLi 812, and generate a set of individual TWT service periods 822 according to the individual TWT SP start time TWTi2, the individual TWT service period SPi2, and the individual TWT interval IVTLi2. The processor 42 computes the doze ratio of the AP 10 according to the set of broadcast TWT service periods 502, the set of individual TWT service periods 812, and the set of individual TWT service periods 822. In some embodiments, processor 42 may sum the non-overlapping periods of the set of broadcast TWT service periods 502, the set of individual TWT service periods 812, and the set of individual TWT service periods 822 in a predetermined period to compute the doze ratio of the AP 10. For example, in FIG. 8, the predetermined period is 1 s and the set of broadcast TWT service periods 502, the set of individual TWT service periods 812, and the set of individual TWT service periods 822 are partially overlapping, and the doze ratio of the AP 10 is 60% (=1460+20+60+20+60+20+60+20+60+20)/1000)), less than the minimum power saving ratio (=70%), being unable to satisfy the power saving requirement of the AP 10. In order to satisfy the power saving requirement of the AP 10, the processor 42 selects the smaller TWT interval of the broadcast TWT interval ITVLb (200 ms) and the individual TWT interval ITVLi1 (100 ms) that is close to the requested individual TWT interval IVTLrq2 (160 ms) as the individual TWT interval ITVLi2 (ITVLi2=100 ms), while reducing the individual TWT service period SPi2 (from 60 ms to thereby generating the second individual TWT schedule. The shorter TWT interval is selected as the individual TWT interval ITVLi2 to reduce the intervals between data transmissions, reducing the transmission delay of the second associated station. Next, the processor 42 generates a set of individual TWT service periods 832 according to the individual TWT SP start time TWTi2, the individual TWT service period SPi2 and the individual TWT interval IVTLi2, and computes the doze ratio of the AP 10 according to the set of broadcast TWT service periods 502, the set of individual TWT service periods 512 and the set of individual TWT service periods 832. In some embodiments, processor 42 may sum the non-overlapping periods of the set of broadcast TWT service periods 502, the set of individual TWT service periods 812, and the set of individual TWT service periods 832 in a predetermined period to compute the doze ratio of the AP 10. For example, the set of broadcast TWT service periods 502, the set of individual TWT service periods 812, and the set of individual TWT service periods 832 are partially overlapping, resulting in the doze ratio of the AP 10 being 80% (=1420+20+20+20+20+20+20+20+

20+20)/1000)), exceeding the minimum power saving ratio (70%), and therefore, the power saving requirement of the AP 10 may be satisfied, and the transceiver 44 may transmit the updated second individual TWT schedule to the STA 122. The second individual TWT schedule may be a recommended individual TWT schedule, and the STA 122 may accept or reject the second individual TWT schedule.

In some embodiments, if the STA 122 rejects the second individual TWT schedule recommended by the AP 10, the AP 10 may accept the second individual TWT request from the associated STA 122, thereby updating the second individual TWT schedule. The processor 42 may update the individual TWT SP start time TWTi2 using the requested individual TWT SP start time TWTrq2 (TWTi2=TBTT), update the individual TWT service period SPi2 using the requested individual TWT service period SPrq2 (SPi2=60 ms), and updates the individual TWT interval ITVLi2 using the requested individual TWT interval ITVLrq2 (ITVLi2=160 ms). The processor 42 then generates a set of requested individual TWT service periods according to the individual TWT SP start time TWTi2, the individual TWT service period SPi2 and the individual TWT interval IVTLi2, and the update the minimum power saving ratio according to the set of broadcast TWT service periods 502, the set of individual TWT service periods 812 and the set of requested individual TWT service periods. In some embodiments, the processor 42 may sum the non-overlapping periods of the set of broadcast TWT service periods 502, the set of individual TWT service periods 812, and the set of requested individual TWT service periods in the predetermined period to compute the updated minimum power saving ratio.

While the embodiments in FIGS. 6-8 illustrate the scheduling methods for two individual TWT schedules, the invention is not limited to two individual TWT schedules, those skilled in the art would recognize that the embodiments may be modified for more than two individual TWT schedules (e.g., 3 individual TWT schedules, 4 individual TWT schedules, N individual TWT schedules, N being a positive integer) based on the principles of the invention.

Figure 9:
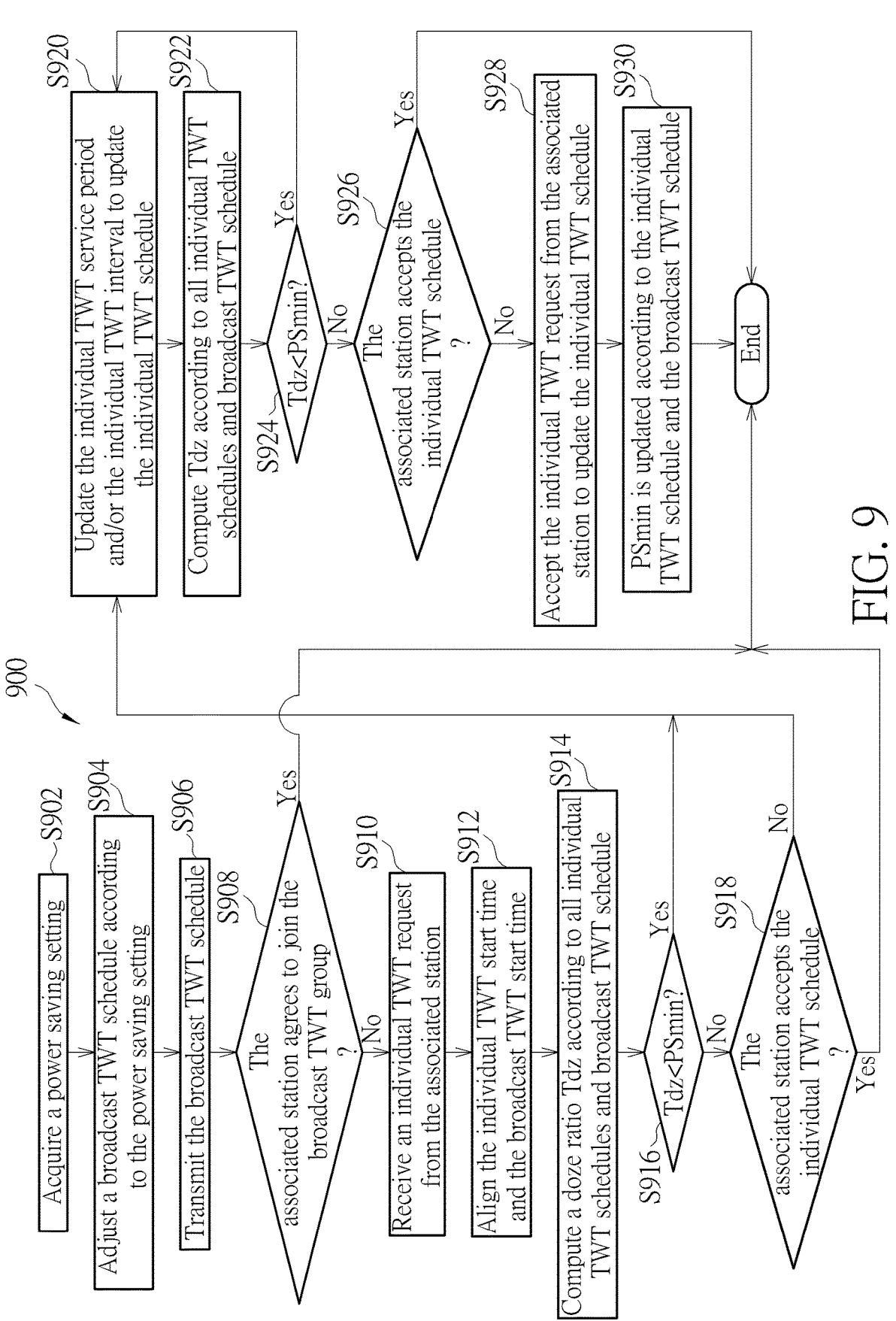
FIG. 9 is a flowchart of a method of scheduling the access point in FIG. 1 according to an embodiment of the invention.

FIG. 9 is a scheduling method 900 of the AP 10. The scheduling method 900 includes Steps S902 to S930 for performing TWT scheduling according to the power saving setting of the AP 10, wherein Steps S902 to S908 are used to establish a broadcast TWT schedule and a broadcast TWT group according to the power saving setting of the AP 10, Steps S910 to S930 are used to create individual TWT schedules according to the minimum power saving ratio of the AP 10 and individual TWT requests of associated stations. Any reasonable step change or adjustment is within the scope of the disclosure. Steps S902 to S930 are detailed as follows:

Step S902: Acquire a power saving setting of the AP 10;

Step S904: Adjust a broadcast TWT schedule according to the power saving setting of the AP 10;

Step S906: Transmit the broadcast TWT schedule;

Step S908: Determine whether the associated station agrees to join the broadcast TWT group? If so, terminate the scheduling method 900; if not, continue to Step S910;

Step S910: Receive an individual TWT request from the associated station;

Step S912: Align the individual TWT SP start time and the broadcast TWT SP start time;

Step S914: Compute a doze ratio Tdz of the AP 10 according to all individual TWT schedules and broadcast TWT schedule;

Step S916: Determine whether the doze ratio Tdz is less than the minimum power saving ratio PSmin? If so, continue to Step S920; if not, continue to Step S918;

Step S918: Determine whether the associated station accepts the individual TWT schedule? If so, terminate the scheduling method 900; if not, continue to Step S920;

Step S920: Update the individual TWT service period and/or the individual TWT interval to update the individual TWT schedule;

Step S922: Compute the doze ratio Tdz of the AP 10 according to all individual TWT schedules and broadcast TWT schedule;

Step S924: Determine whether the doze ratio Tdz is less than the minimum power saving ratio PSmin? If so, go back to Step S920; if not, continue to Step S926;

Step S926: Determine whether the associated station accepts the individual TWT schedule? If so, terminate the scheduling method 900; if not, continue to Step S928;

Step S928: Accept the individual TWT request from the associated station to update the individual TWT schedule, continue to S930.

Step S930: The minimum power saving ratio PSmin of the AP 10 is updated according to the individual TWT schedule and the broadcast TWT schedule; terminate the scheduling method 900.

In Step S902, the input device 41 receives the power saving setting of the AP 10 from a user. Next, the processor 42 adjusts the broadcast TWT schedule according to the predetermined power saving mode and the power saving setting of the AP 10 (S904), and transmits the broadcast TWT schedule (S906). The AP 10 may request the associated station to join the broadcast TWT group, and receive a response from the associated station regarding whether to join the broadcast TWT group. In Step S908, the processor 42 determines whether the associated station agrees to join the broadcast TWT group according to the response. If the associated station agrees to join the broadcast TWT group, the processor 42 adds the associated station to the broadcast TWT group, the transceiver 44 performs data transmissions of the associated station according to the broadcast TWT schedule, and the scheduling method 900 is terminated.

If the associated station refuses to join the broadcast TWT group, the transceiver 44 receives the individual TWT request of the associated station to trigger the negotiation process for the individual TWT (S910). The processor 42 first aligns the individual TWT SP start time and broadcast TWT SP start time to generate an individual TWT schedule for the associated station (S912). The method of aligning the individual TWT SP start time and the broadcast TWT SP start time has been explained in the preceding paragraphs, and the explanation therefor will not be repeated here. Next, the processor 42 computes the doze ratio Tdz of the AP 10 according to all the individual TWT schedules and the broadcast TWT schedule (S914), and determines whether the doze ratio Tdz is less than the minimum power saving ratio PSmin (S916). If so, the existing TWT schedule cannot meet the power saving requirement of the AP 10, and consequently, the processor 42 updates the individual TWT service period and/or the individual TWT interval, thereby updating the individual TWT schedule of the associated station (S920). If not, the existing TWT schedule has met the power saving requirement of the AP 10, and therefore, the transceiver 44 transmits the individual TWT response including the individual TWT schedule to the associated station, and the processor 42 determines whether the associated station accepts the individual TWT schedule (S918).

If the associated station accepts the individual TWT schedule, the transceiver 44 transmits data to the associated station according to the individual TWT schedule, and the scheduling method 900 is terminated. If the associated station refuses to accept the individual TWT schedule, the processor 42 updates the individual TWT service period and/or the individual TWT interval, thereby updating the individual TWT schedule of the associated station (S920). The method of updating the service time of the individual TWT and/or the interval of the individual TWT has been explained in the preceding paragraphs, and the details thereof will not be repeated here. In Step S922, the processor 42 determines whether the doze ratio Tdz is less than the minimum power saving ratio PSmin. If so, the existing TWT schedule cannot meet the power saving requirement of the AP 10, and consequently, the processor 42 once again updates the individual TWT service period and/or the individual TWT interval, thereby updating the individual TWT schedule of the associated station (S920). If not, the existing TWT schedule has satisfied the power saving requirement of the AP 10, and therefore, the transceiver 44 transmits the updated individual TWT response including the individual TWT schedule to the associated station, and the processor 42 determines whether the associated station accepts the updated individual TWT schedule (S926).

If the associated station accepts the updated individual TWT schedule, the transceiver 44 transmits data to the associated station according to the updated individual TWT schedule, and the scheduling method 900 is terminated. If the associated station rejects the updated individual TWT schedule, the processor 42 accepts the individual TWT request from the associated station to update the individual TWT schedule (S928), and updates the minimum power saving ratio of the AP 10 PSmin according to the individual TWT schedule and the broadcast TWT schedule (S930). The method of updating the minimum power saving ratio PSmin has been explained in the preceding paragraphs, and will not be repeated here.

The scheduling method 900 performs TWT scheduling according to the power saving settings of the AP 10, aligns the individual TWT schedule and broadcast TWT schedule, and adjusts the individual TWT schedule to satisfy the power saving requirement, thereby enhancing the power saving efficiency of the AP 10.

Figure 10:
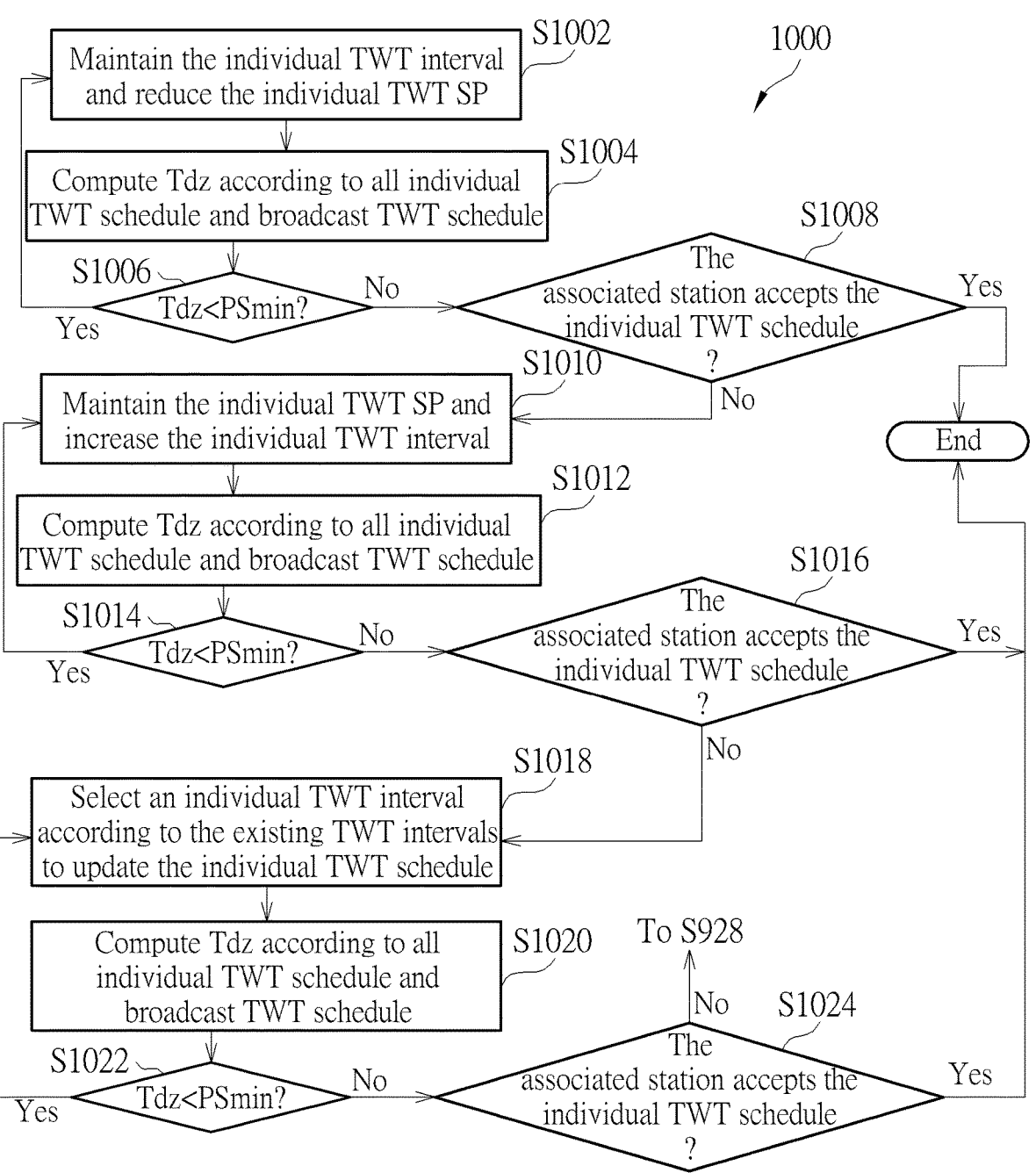
FIG. 10 is a flowchart of a method of scheduling the access point in FIG. 1 according to another embodiment of the invention.

FIG. 10 is a flowchart of another scheduling method 1000 of the AP 10. The scheduling method 1000 includes Steps S1002 to S1024 to illustrate detail Steps of S920 to S926 in the scheduling method 900. Any reasonable step change or adjustment is within the scope of the disclosure. Steps S1002 to S1024 are detailed as follows:

Step S1002: Maintain the individual TWT interval and reduce the individual TWT SP to update the individual TWT schedule;

Step S1004: Compute the doze ratio Tdz of the AP 10 according to all individual TWT schedule and broadcast TWT schedule;

Step S1006: Determine whether the doze ratio Tdz is less than the minimum power saving ratio PSmin? If so, go back to Step S1002; if not, continue to Step S1008;

Step S1008: Determine whether the associated station accepts the individual TWT schedule? If so, terminate the scheduling method 1000; if not, continue to Step S1010;

Step S1010: Maintain the individual TWT SP and increase the individual TWT interval to update the individual TWT schedule;

Step S1012: Compute the doze ratio Tdz of the AP 10 according to all individual TWT schedule and broadcast TWT schedule;

Step S1014: Determine whether the doze ratio Tdz is less than the minimum power saving ratio PSmin? If so, go back to Step S1010; if not, continue to Step S1016;

Step S1016: Determine whether the associated station accepts the individual TWT schedule? If so, terminate the scheduling method 1000; if not, continue to Step S1018;

Step S1018: Select an individual TWT interval according to the existing TWT intervals and to update the individual TWT schedule;

Step S1020: Compute the doze ratio Tdz of the AP 10 according to all individual TWT schedule and broadcast TWT schedule;

Step S1022: Determine whether the doze ratio Tdz is less than the minimum power saving ratio PSmin? If so, go back to Step S1018; if not, continue to Step S1024;

Step S1024: Determine whether the associated station accepts the individual TWT schedule? If so, terminate the scheduling method 1000; if not, continue to Step S928.

Steps S1002 to S1008 are used to reduce the individual TWT SP to update the individual TWT schedule and confirm whether the associated station accepts the updated individual TWT schedule. The method of reducing the individual TWT SP has been explained in the preceding paragraphs, and the details thereof will not be repeated here. If so, the transceiver 44 performs data transmission of the associated station according to the updated individual TWT schedule, and the scheduling method 1000 terminated. Otherwise, proceed to Steps S1010 to S1016.

Steps S1010 to S1016 are used to update the individual TWT schedule by increasing the individual TWT interval and determine whether the associated station accepts the updated individual TWT schedule. The method of increasing the interval between individual TWTs has been explained in the preceding paragraphs, and the details thereof will not be repeated here. If so, the transceiver 44 performs data transmission of the associated station according to the updated individual TWT schedule, and the scheduling method 1000 terminated. Otherwise, proceed to Steps S1018 to S1024.

Steps S1018 to S1024 are used to update the individual TWT schedule by simultaneously adjust the individual TWT interval and individual TWT SP, and determine whether the associated station accepts the updated individual TWT schedule. The method of adjusting the individual TWT interval and individual TWT SP has been explained in the preceding paragraphs, and the details thereof will not be repeated here. If so, the transceiver 44 performs data transmission of the associated station according to the updated individual TWT schedule, and the scheduling method 1000 terminated. Otherwise, go to Step S928 of the scheduling method 900, execute Steps S928 and S930 in sequence, and then terminate the scheduling method 900.

In some embodiments, the positions of steps S1002 and S1010 may be interchangeable. The AP 10 may adjust the individual TWT interval first to update the individual TWT schedule. If the associated station rejects the updated individual TWT schedule, the AP 10 then adjusts the individual TWT SP to update the individual TWT schedule again.

The scheduling method 1000 adjusts individual TWT schedules according to the power saving setting of the AP 10 to satisfy the power saving requirement, thereby enhancing the power saving efficiency of the AP 10.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scheduling method for scheduling a target wake time (TWT) communication between an access point and at least one station, the scheduling method comprising:
the access point configuring an ideal power saving ratio of the access point;
the access point adjusting a broadcast TWT schedule according to at least the ideal power saving ratio of the access point in a power saving setting, the broadcast TWT schedule comprising a broadcast TWT SP start time, a broadcast TWT service period (SP) and a broadcast TWT interval; and
the access point transmitting the broadcast TWT schedule.

2. The method of claim 1, wherein the access point adjusting the broadcast TWT schedule according to at least the ideal power saving ratio of the access point in the power saving setting comprises:
the access point adjusting the broadcast TWT service period according to the ideal power saving ratio and a beacon interval; and
the access point setting the broadcast TWT interval according to the beacon interval.

3. The method of claim 1, wherein the access point adjusting the broadcast TWT schedule according to at least the ideal power saving ratio of the access point in the power saving setting comprises:
the access point adjusting the broadcast TWT service period according to the ideal power saving ratio and a delivery traffic indication message (DTIM) interval; and
the access point setting the broadcast TWT interval according to the DTIM interval.

4. The method of claim 1, wherein the power saving setting further comprises a predetermined TWT interval; and
the access point adjusting the broadcast TWT schedule according to at least the ideal power saving ratio of the access point in the power saving setting comprises:
the access point adjusting the broadcast TWT service period according to the ideal power saving ratio and the predetermined TWT interval; and
the access point setting the broadcast TWT interval according to the predetermined TWT interval.

5. The method of claim 1, wherein the power saving setting further comprises a predetermined TWT service period; and
the access point adjusting the broadcast TWT schedule according to at least the ideal power saving ratio of the access point in the power saving setting comprises:
the access point adjusting the broadcast TWT interval according to the ideal power saving ratio and the predetermined TWT service period; and
the access point setting the broadcast TWT service period according to the predetermined TWT service period.

6. The method of claim 1,
wherein the broadcast TWT SP start time in the first individual TWT schedule is identical to the broadcast TWT SP start time in the broadcast TWT schedule.

7. The method of claim 6, wherein the power saving setting comprises a minimum power saving ratio, and the method further comprises:
the access point setting the first individual TWT service period according to the first requested individual TWT service period;
the access point setting the first individual TWT interval according to the first requested individual TWT interval; and
the access point updating the first individual TWT service period and/or the first individual TWT interval based on the minimum power saving ratio.

8. The method of claim 7,
further comprising:
the access point generating a set of broadcast TWT service periods according to the broadcast TWT SP start time, the broadcast TWT service period and the broadcast TWT interval;
the access point generating a set of first individual TWT service periods according to the broadcast TWT SP start time, the first individual TWT service period and the first individual TWT interval; and
the access point computing a first doze ratio of the access point according to the set of broadcast TWT service periods and the set of first individual TWT service periods;
wherein the access point updating the first individual TWT service period and/or the first individual TWT interval based on the minimum power saving ratio comprises:
if the first doze ratio is less than the minimum power saving ratio, the access point updating the first individual TWT service period and/or the first individual TWT interval.

9. The method of claim 8, further comprising:
the access point receiving a second individual TWT request from a second station of the at least one station, the second individual TWT request comprising a second requested individual TWT service period and a second requested individual TWT interval; and
the access point transmitting a second individual TWT schedule to the second station, the second individual TWT schedule comprising the broadcast TWT SP start time, a second individual TWT service period and a second individual TWT interval;
wherein the broadcast TWT SP start time in the second individual TWT schedule is identical to the broadcast TWT SP start time in the broadcast TWT schedule.

10. The method of claim 9, further comprising:
the access point generating a set of second individual TWT service periods according to the broadcast TWT SP start time, the second individual TWT service period and the second individual TWT interval;
the access point computing a second doze ratio of the access point according to the set of broadcast TWT service periods, the set of first individual TWT service periods and the set of second individual TWT service periods; and
if the second doze ratio is less than the minimum power saving ratio, the access point updating the second individual TWT service period and/or the second individual TWT interval.

11. An access point of scheduling a target wake time (TWT) communication from the access point to at least one station, the access point comprising:

a processor configured to configure an ideal power saving ratio of the access point, adjust a broadcast TWT schedule according to at least the ideal power saving ratio of the access point in a power saving setting, the broadcast TWT schedule comprising a broadcast TWT SP start time, a broadcast TWT service period (SP) and a broadcast TWT interval; and a transceiver coupled to the processor and configured to transmit the broadcast TWT schedule.

12. The access point of claim 11, wherein the processor is configured to adjust the broadcast TWT service period according to the ideal power saving ratio and a beacon interval, and set the broadcast TWT interval according to the beacon interval.

13. The access point of claim 11, wherein the processor is configured to adjust the broadcast TWT service period according to the ideal power saving ratio and a delivery traffic indication message (DTIM) interval, and set the broadcast TWT interval according to the DTIM interval.

14. The access point of claim 11, wherein the power saving setting further comprises a predetermined TWT interval; and the processor is configured to adjust the broadcast TWT service time according to the ideal power saving ratio and the predetermined TWT interval, and set the broadcast TWT interval according to the predetermined TWT interval.

15. The access point of claim 11, wherein the power saving setting further comprises a predetermined TWT service period; and the processor is configured to adjust the broadcast TWT interval according to the ideal power saving ratio and the predetermined TWT service period, and set the broadcast TWT service period according to the predetermined TWT service period.

16. The access point of claim 11, wherein:

the transceiver is further configured to receive a first individual TWT request from a first station of the at least one station, the first individual TWT request comprising a first requested individual TWT service time and a first requested individual TWT interval; and the transceiver is further configured to transmit a first individual TWT schedule to the first station, the first individual TWT schedule comprising the broadcast TWT SP start time, a first individual TWT service period and a first individual TWT interval;

wherein the broadcast TWT SP start time in the first individual TWT schedule is identical to the broadcast TWT SP start time in the broadcast TWT schedule.

17. The access point of claim 16, wherein:

the processor is further configured to set the first individual TWT service period according to the first requested individual TWT service period, and set the first individual TWT interval according to the first requested individual TWT interval.

18. The access point of claim 17, wherein the power saving setting further comprises a minimum power saving ratio; and the processor is further configured to generate a set of broadcast TWT service periods according to the broadcast TWT SP start time, the broadcast TWT service period and the broadcast TWT interval, generate a set of first individual TWT service periods according to the broadcast TWT SP start time, the first individual TWT service period and the first individual TWT interval, compute a first doze ratio of the access point according to the set of broadcast TWT service periods and the set of first individual TWT service periods, and if the first doze ratio is less than the minimum power saving ratio, update the first individual TWT service period and/or the first individual TWT interval.

19. The access point of claim 18, wherein:

the transceiver is further configured to receive a second individual TWT request from a second station of the at least one station, the second individual TWT request comprising a second requested individual TWT service period and a second requested individual TWT interval; and the transceiver is further configured to transmit a second individual TWT schedule to the second station, the second individual TWT schedule comprising the broadcast TWT SP start time, a second individual TWT service period and a second individual TWT interval;

wherein the broadcast TWT SP start time in the second individual TWT schedule is identical to the broadcast TWT SP start time in the broadcast TWT schedule.

20. The access point of claim 19, wherein the processor is further configured to generate a set of second individual TWT service periods according to the broadcast TWT SP start time, the second individual TWT service period and the second individual TWT interval, compute a second doze ratio of the access point according to the set of broadcast TWT service periods, the set of first individual TWT service periods and the set of second individual TWT service periods, and if the second doze ratio is less than the minimum power saving ratio, update the second individual TWT service period and/or the second individual TWT interval.

* * * * *